UNITED STATES PATENT OFFICE.

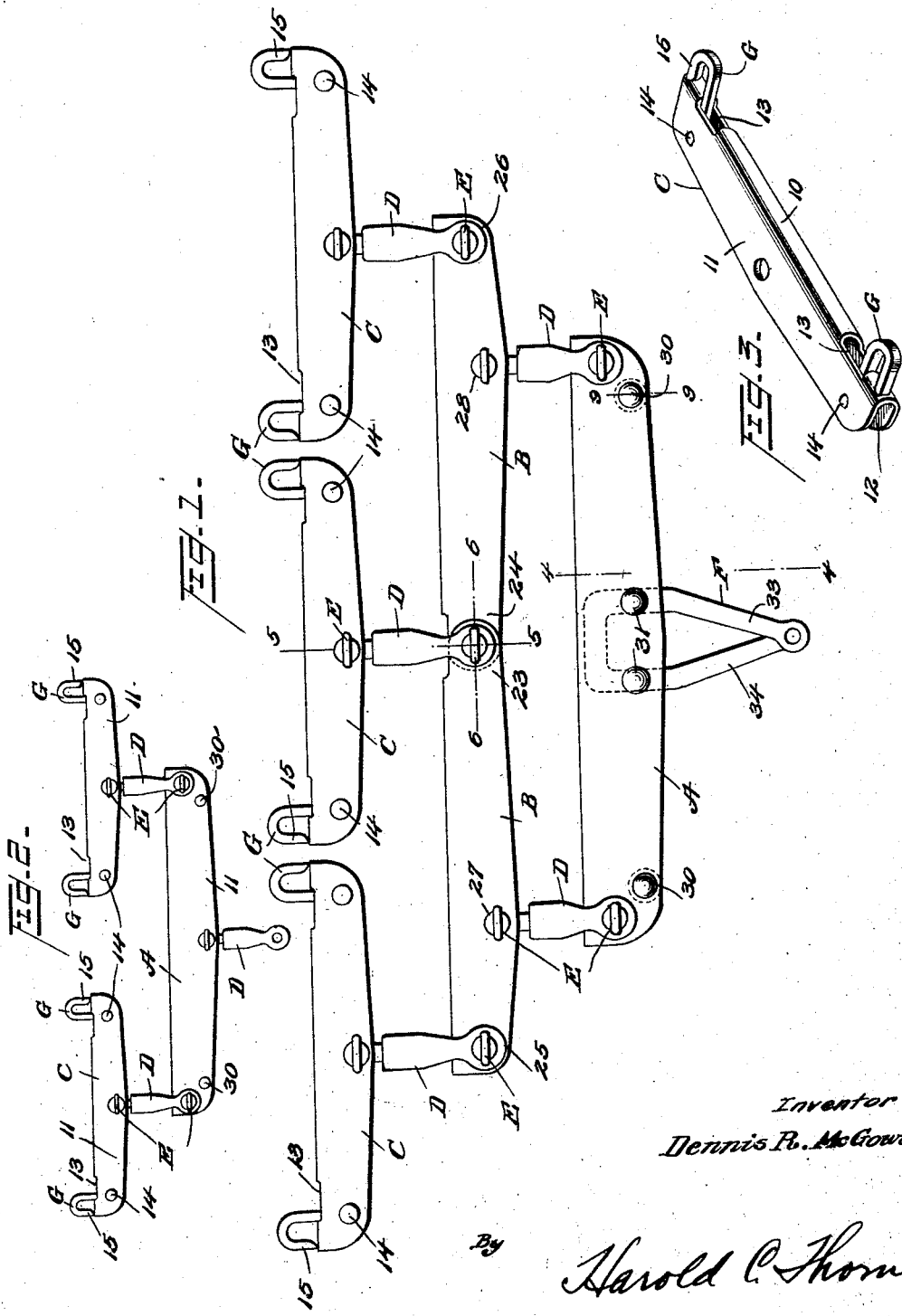

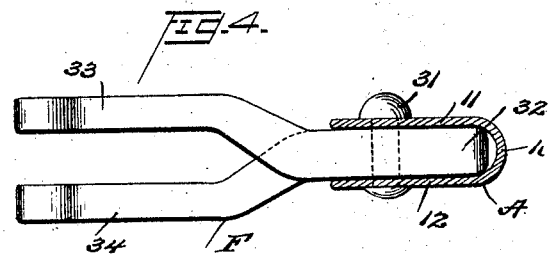
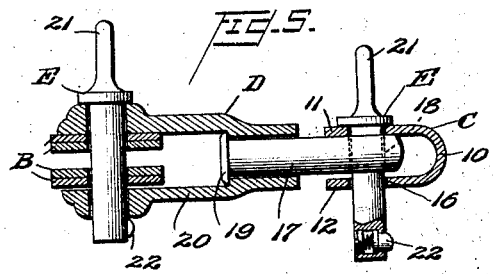
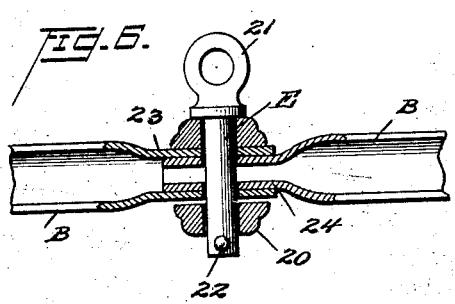
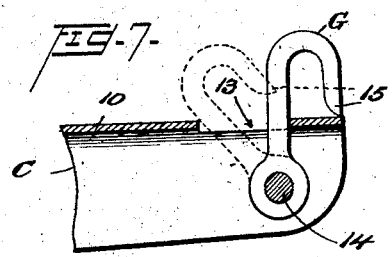
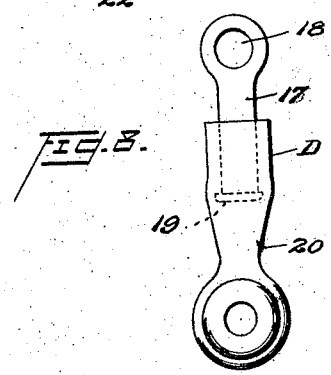
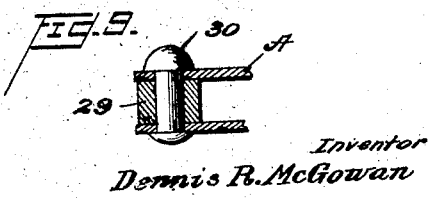

DENNIS R. McGOWAN, OF UNIONVILLE, TENNESSEE.

DRAFT MECHANISM.

1,408,898.  Specification of Letters Patent.  Patented Mar. 7, 1922.

Application filed April 2, 1921. Serial No. 457,926.

*To all whom it may concern:*

Be it known that I, DENNIS R. McGOWAN, a citizen of the United States, residing at Unionville, in the county of Bedford and State of Tennessee, have invented certain new and useful Improvements in Draft Mechanism, of which the following is a specification.

This invention relates to draft appliances for hitching two or more horses abreast to a plow or other implement to be drawn.

The details and objects of the invention will appear as described in connection with the accompanying drawings and hereinafter set forth and claimed.

Referring to the drawings forming a part of this specification, like characters of reference designate corresponding parts throughout the several views in which,—

Figure 1 is a plan view of a three horse hitch constructed in accordance with my invention;

Fig. 2 is a plan view of a two horse hitch employing various parts of the hitch represented in Figure 1, the two figures illustrating the interchangeability of parts and manner in which the number of draft appliances may be increased or diminished;

Fig. 3 is a perspective view of a single tree represented in Figs. 1 and 2;

Fig. 4 is a section taken on line 4—4 of Fig. 1;

Fig. 5 is a section taken on line 5—5 of Fig. 1;

Fig. 6 is a section taken on line 6—6 of Fig. 1;

Fig. 7 is a longitudinal section through an end of one of the single trees;

Fig. 8 is a plan view of a swivel clevis member adapted for use with the draft devices shown, and Fig. 9 is a section taken on line 9—9 of Fig. 1.

Referring to the drawings, in Figs. 1 and 2 the principal parts of the draft appliance comprising draft bars or the double tree, equalizing members and single tree, are generally designated by the reference letters, A, B and C respectively. These members are conveniently connected by means of swivel clevises D and pins E, and the double tree is adapted to be connected with an implement by means of a draft coupling F. The single trees are provided with hooks G for attaching with the traces.

The draft bars are preferably made from sheet metal blanks bent over so as to present a closed front portion 10 and rearwardly extending upper and lower faces 11 and 12, as clearly shown in Fig. 3, the perspective view of the single tree. The single tree C has two slots 13 adjacent the ends thereof through which the trace hooks pass and are pivoted at 14. (See also Fig. 7.) The normal position of the hooks G is as shown, with their outer free ends 15 engaging the front 10 of the single tree, and the construction is such that the end of the chain will tend to hold it in this position rather than to slip out when there is a side thrust on it. However, when it is desired to disengage the trace or place it in the hook, the hook may readily be swung back on its pivot to the dotted line position, Fig. 7, and there will be ample space between the end 15 and the front portion 10 of the single tree for the end of the trace to pass through.

The single tree is apertured at 16 to receive a pin E or a rivet for temporarily or permanently pivoting a clevis member D to it. The clevis is best shown in Figs. 5 and 8 at 18 for connection with a pivot pin or rivet and provided with a head 19 for engaging the yoke 20, two members of which are formed for receiving one of the pins E.

The pin E, see particularly Figs. 5 and 6, has a thumb and finger grip ring 21 at its upper end, and a locking projection 22 at its lower end which is adapted to be depressed when the pin is thrust through the members which it joins, but the projection 22 will normally protrude and prevent the disconnecting of the members and losing of the pin as is apparent.

The equalizer bars V are formed in a manner similar to the single trees and their adjacent ends 23 and 24 are made so that one will include the other and the yoke of one of the clevises D may pass over them. A pin E passing through the yoke of the clevis and ends of these bars will afford a pivotal connection between them and universal connection for a single tree—see Figures 5 and 6. Single trees are also connected by means of clevises D to the outer ends of these bars at 25 and 26, and as is obvious by making them longer, double trees might be substituted for the single trees, so as to connect six animals abreast.

The equalizer bars V are apertured at 27 and 28, a third of the distance between the apertures 25 and 26 and the apertures in the ends 23 and 24, in from the outer ends, and they are connected by clevises to the double tree A.

Double tree A is also constructed similar to the single trees, and as shown in Figs. 1 and 9 the construction may be reinforced by placing spacer members 29 between the upper and lower faces and fastening them in place with rivets 30. The same draft bar may be used for connecting two horses, as represented in Fig. 2, as used with the equalizer as shown in Fig. 1, but allowing more space between the single trees.

A draft coupling F as disclosed in Figs. 1 and 4, is preferably fastened by rivets 31 to the double tree for connecting it with an implement, but if desired, it may be detachably fastened thereto with pins such as E. This draft coupling F, as shown, has a yoke 32 from which side members 33 and 34 extend rearwardly, being bent up and down respectively, and then toward each other, so that their ends will be in the same vertical line and apertures through them provide for a pin connection with a horizontally disposed draw bar on the implement to be drawn. This construction of the rearwardly extending members 33 and 34 allows clearance between them for the draw bar so that the draft appliance can swing through wide limits when necessary.

The various parts of the draft mechanism as disclosed may be constructed as standard articles of manufacture which can be interchangeably connected and added to as required. The single tree when provided with one of the swivel clevises may be connected with either a horizontal or a vertically disposed draft device, as will be apparent, and the double tree may also be provided with a clevis, as shown in Fig. 2, when desired.

I do not wish to limit myself to any specific constructions as described in this specification for the purpose of giving examples or illustrations of my invention, for it is obvious that various changes in the details may be resorted to without departing from the spirit and scope of my invention, which is set forth in the following claims.

What I claim as my invention and desire to secure by Letters Patent, is:

1. A draft appliance including a double tree, a two part equalizer for three draft bars connected with said double tree with the meeting ends of the equalizer in over-lapping relation, clevises connected to the outer ends of said equalizer, a clevis connected with the meeting ends of the equalizer by means of a pivot pin passing through the clevis and said meeting ends of the equalizer, and a draft bar connected with each clevis.

2. A draft bar comprising a metal blank bent throughout its length between its longitudinal edges into a U, attaching means at the ends thereof for draft devices, and a draft coupling member fastened between the upper and lower walls of the bar at the middle thereof comprising a longitudinal yoke having rearwardly extending arms, one of which is bent upwardly beyond the edges of the blank and the other downwardly, and then toward a vertical axis to the rear of the bar and having concentric apertures for a pin connection with a horizontally disposed draw bar.

3. A draft appliance including a double tree, a two part equalizer and three whiffletrees comprising longitudinal metal U-shaped members, clevises connecting the equalizer members with the double tree in a manner that the meeting ends of the equalizer overlap, a clevis connected with one of the whiffletrees and pivoted to said meeting ends of the equalizer, and clevises at the remote ends of the equalizer for connecting the other two whiffletrees therewith.

4. A draft bar comprising a longitudinal metal U-shaped member having apertures adjacent to its ends, and hooks having ends pivoted between the parallel portions, extending through said apertures and their other ends engaging the ends of the bar and adapted to be swung inwardly so as to be out of engagement therewith.

In testimony whereof I affix my signature.

DENNIS R. McGOWAN.